(12) United States Patent
    MacCarthaigh

(10) Patent No.: US 8,756,272 B1
(45) Date of Patent: Jun. 17, 2014

(54) PROCESSING ENCODED CONTENT

(75) Inventor: Colm MacCarthaigh, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 471 days.

(21) Appl. No.: 12/869,664

(22) Filed: Aug. 26, 2010

(51) Int. Cl.
    *G06F 15/16* (2006.01)
(52) U.S. Cl.
    USPC ........................................................ 709/203
(58) Field of Classification Search
    USPC .................................. 709/203, 223; 713/153
    See application file for complete search history.

(56) References Cited

U.S. PATENT DOCUMENTS 8,199,752 B2* 6/2012 Swanson et al. ............... 370/389
8,200,958 B2* 6/2012 Coppola et al. ............... 713/153

* cited by examiner

*Primary Examiner* — Adnan Mirza
(74) *Attorney, Agent, or Firm* — Knobbe, Martens, Olson & Bear, LLP

(57) ABSTRACT

A system and method for the management of client computing device content requests by service providers are provided. The requested content corresponds to content organized as a series of ordered frames, which include a number of reference frames. The management of the content requests can include the selection of computing devices corresponding to various Point of Presence locations for providing requested content. The selection of the computing devices can incorporate logic related to the delivery of a first subset of the content from a Point of Presence based on minimizing delivery latencies. The selection of the computing devices can incorporate logic related to the delivery of a second subset of the content from a second Point of Presence based on minimizing costs associated with delivery of the second subset.

31 Claims, 11 Drawing Sheets

PROCESSING ENCODED CONTENT

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device or consideration of a cost associated with the transmission of the content. For larger scale implementations, a content provider may receive content requests from a high volume of client computing devices or for larger sized pieces of content (e.g., high resolution video content) which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device or consideration of a cost associated with the transmission of the content. Additionally, CDN service providers often consider factors such as latency of delivery of requested content in order to meet service level agreements with contracted content providers or generally improve the quality of delivery service. The consideration of such factors can be applied with regard to decisions by a CDN service provider as to which of the several available computing devices is best suited to process client computing device requests for content. In some embodiments, selection of a computing device for purposes of minimizing latencies or improving the quality of the delivery service corresponds to a higher cost incurred by the CDN service provider, content provider, or both.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, aspects of the present disclosure are directed to providing content. Specifically, aspects of the disclosure will be described with regard to the management of client computing device content requests by service providers, such as content delivery network ("CDN") service providers. Illustratively, the requested content corresponds to content which can be encoded as a series of ordered subparts, such as frames. Additionally, the content can include a number of reference subparts through the series of ordered subparts. Accordingly, the management of the content requests can include the selection of computing devices corresponding to various Point of Presence locations for providing requested content. The selection of the computing devices can incorporate logic related to the delivery of a first subset of the content from a Point of Presence based on minimizing delivery latencies. The selection of the computing devices can incorporate logic related to the delivery of a second subset of the content from a second Point of Presence based on minimizing costs associated with delivery of the second subset. Although various aspects of the disclosure will be described with regard to illustrative examples and embodiments, one skilled in the art will appreciate that the disclosed embodiments and examples should not be construed as limiting.

Figure 1:
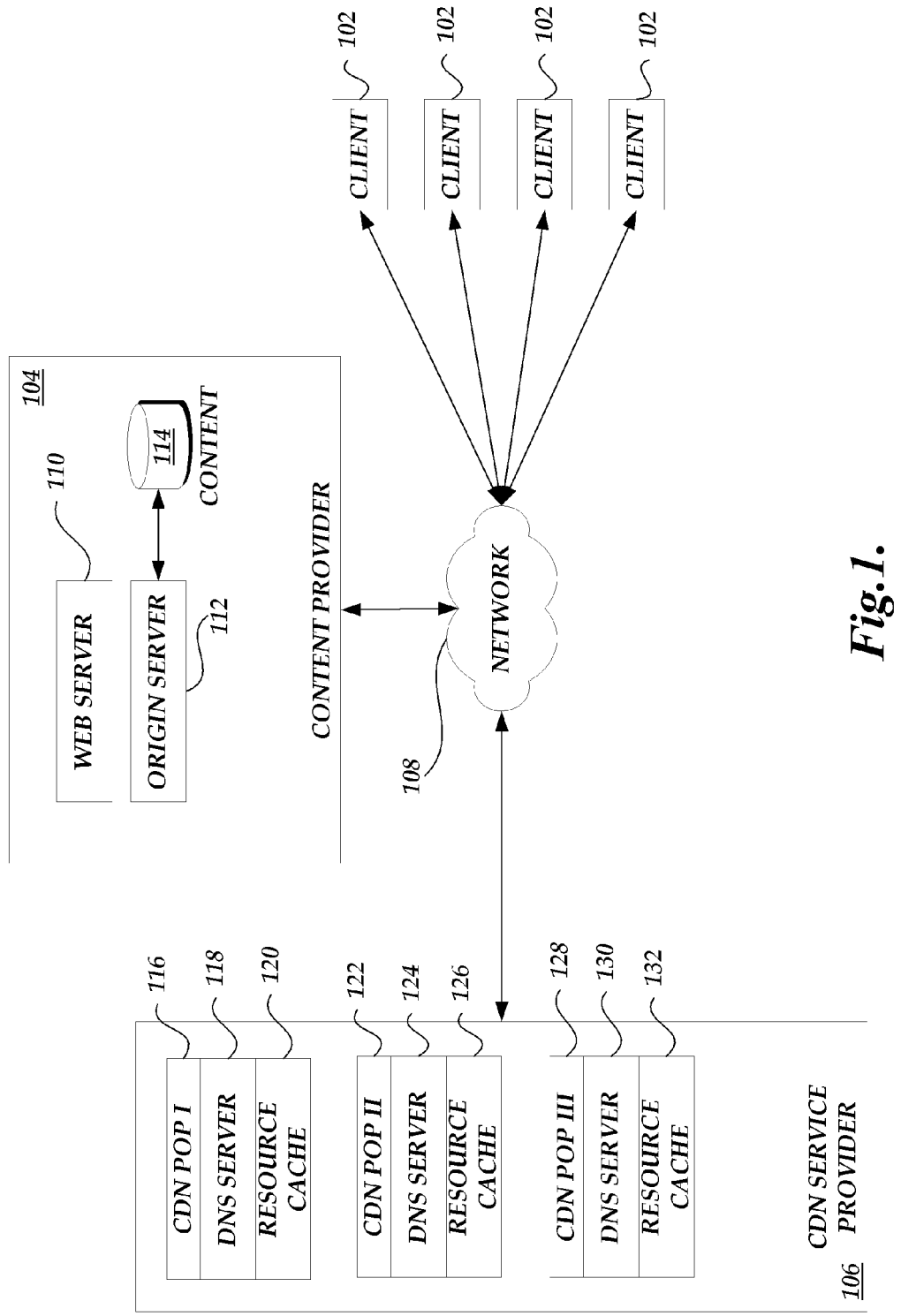
FIG. 1 is a block diagram illustrative of content delivery environment including a number of client computing devices, a content provider, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. As will be explained in greater detail below, the requested content will correspond, at least in part, content that has been encoded into one or more subparts, such as for purposes of data compression. The encoded content can be rendered or processed by the client computing in an ordered manner. An example of such ordered content includes streaming media content. In an illustrative embodiment, the client computing devices 102 can corresponds to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 can utilize some type of local DNS resolver component, such as a DNS Name server, that generates the DNS queries attributed to the client computing device 102. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102. However, for purposes of the present disclosure, communications facilitated through a network component, such as a DNS Resolver component, will be illustrated as transmitted directly from the client computing devices 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence (herein "POP") locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers. The DNS components 118, 124 and 130 and the resource cache components 120, 126 132 may further include additional software and/or hardware components that facilitate communications including, but not limited, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN Provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
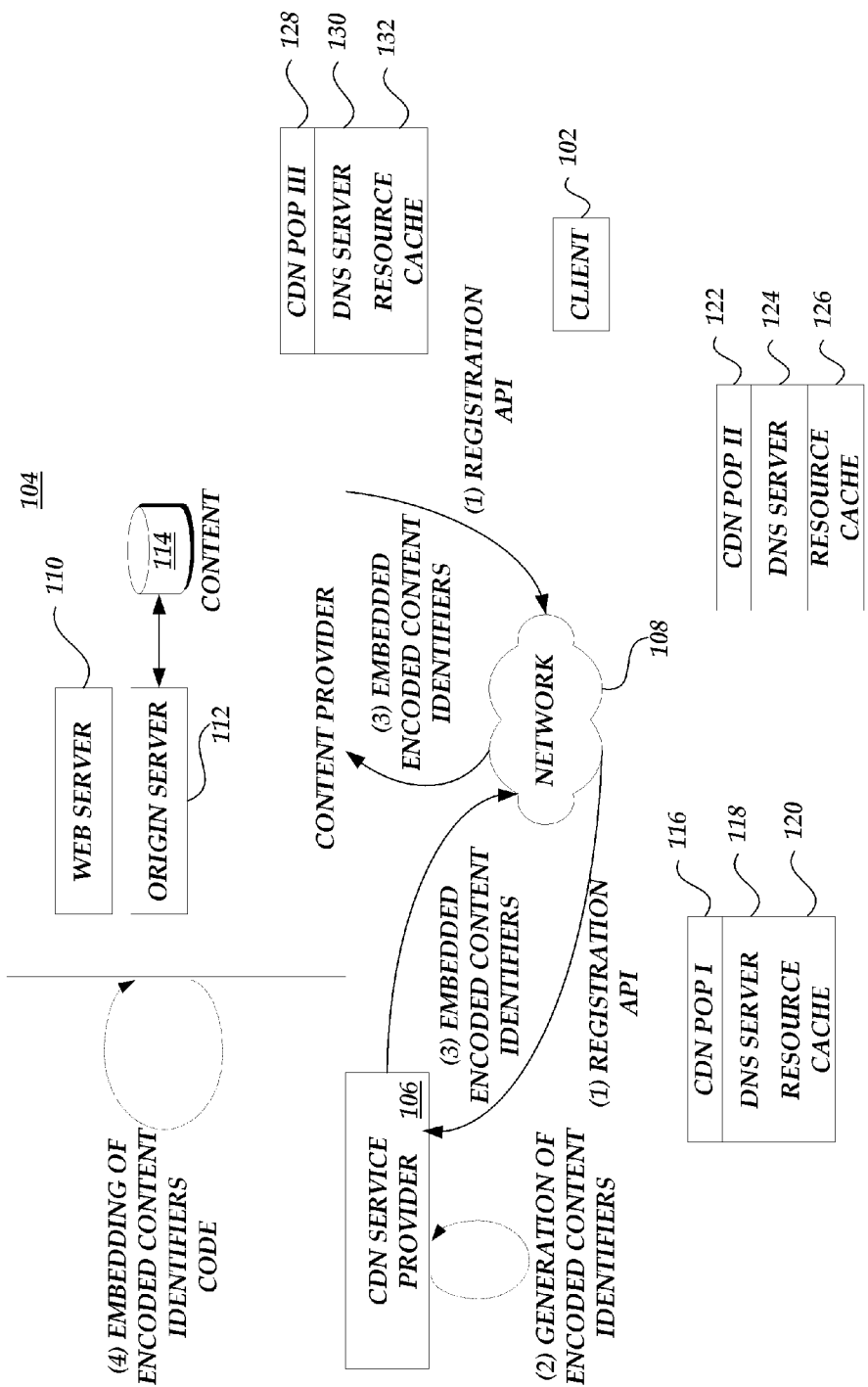
FIG. 2 is a block diagram of the content delivery environment of FIG. 1 illustrating the registration of a content provider with a content delivery service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, the like. One skilled in the relevant art will appreciate that various types of additional information may be generated by the CDN service provider 106 and that the additional information may be embodied in any one of a variety of formats.

Illustratively, the CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers, such as Uniform Resource Locators ("URLs") originally directed toward a domain of the origin server 112 to a domain corresponding to the CDN service provider. The translated URLs are embedded into requested content in a manner such that DNS queries for the translated URLs will resolve to a DNS sever corresponding to the CDN service provider 106 and not a DNS server corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a URL. Because the resource identifiers are included in the requested content directed to the content provided, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). The translated URL would have the form of:

http://additional_information.cdnprovider.com/path/resources.xxx

Figure 3:
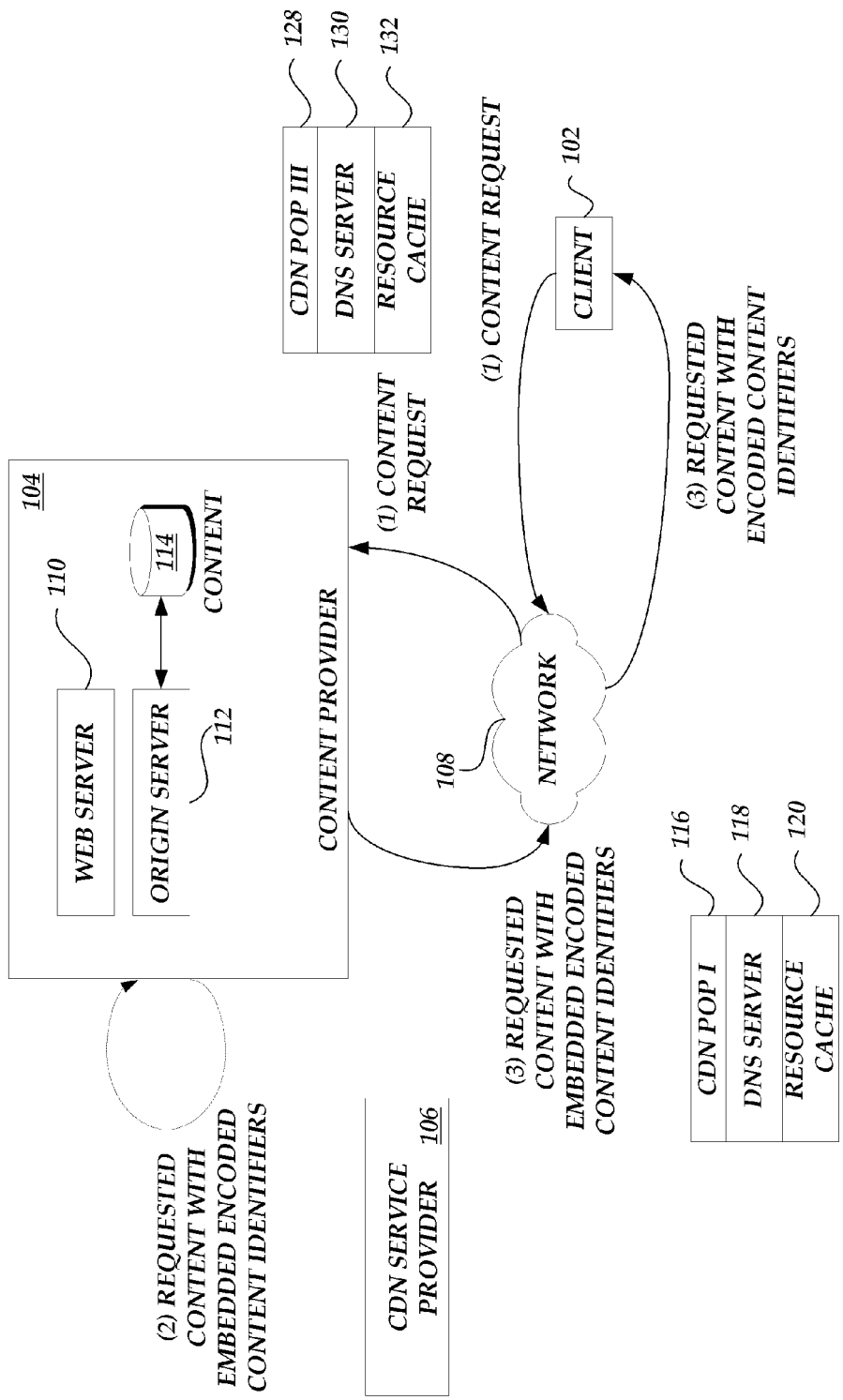
FIG. 3 is a block diagram of the content delivery environment of FIG. 1 illustrating the generation and processing of a content request from a client computing device to a content provider.

In another embodiment, the information associated with the CDN service provider 106 is included the modified URL, such as through prepending or other techniques, such that the translated URL can maintain all of the information associated with the original URL. In this embodiment, the translated URL would have the form of:

http://additional_information.cdnprovider.com/www.contentprovider.com/path/resource.xxx With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs. However, ones skilled in the relevant art will appreciate that the client computing device 102 may initiate content requests in accordance with alternative embodiments and in conjunction with alternative network protocols.

In one embodiment, upon receipt of the requested content, the client computing device 102, such as through a browser software application, begins processing any of the markup code included in the content and attempts to acquire the resources identified by the embedded resource identifiers. In another embodiment, the client computing device 102 may attempt to acquire resources identified by embedded resource identifiers on an event driven basis, such as responsive to user initiated actions, satisfaction of time based criteria or other defined events. Although not illustrated in FIG. 3, the client computing device 102 would first issue a DNS query for the embedded resource previously provided by the CDN service provider 102, which if properly resolved, would include the identification of the above mentioned IP address associated with the CDN service provider 106. For example, the first step in acquiring the content correspond to the issuance, by the client computing device 102 (through its local DNS resolver), a DNS query for the Original URL resource identifier that results in the identification of a DNS server authoritative to the "." and the "com" portions of the translated URL.

After resolving the "." and "com" portions of the embedded URL, the client computing device 102 then issues a DNS query for the resource URL that results in the identification of a DNS server authoritative to the ".cdnserviceprovider" portion of the embedded URL. One skilled in the relevant art will appreciate that the resolution of the DNS query may involve multiple DNS queries to either the content provider 104 or CDN service provider 106. Specifically, the successful resolution of the "cdnserviceprovider" portion of the original URL identifies a network address, such as an IP address, of a DNS server associated with the CDN service provider 106. In this embodiment, the IP address can be shared by one or more POPs. Accordingly, the further DNS query to the shared IP address utilizes a one-to-many network routing schema, such as anycast, such a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP. As will be explained in greater detail, the resolution of the Original URL will identify the IP address of a POP that has been determined to be best suited to process content requests from the client computing device 102.

Figure 4:
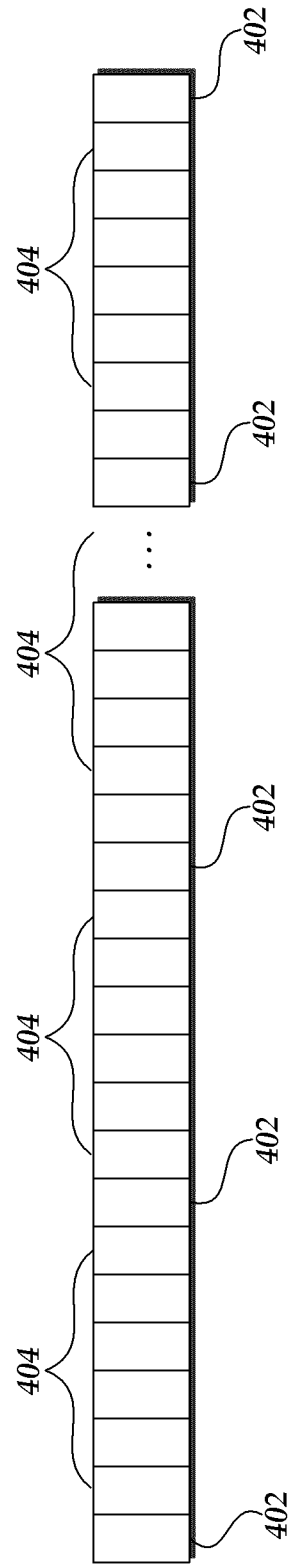
FIG. 4 is a block diagram illustrative of a structure of content having ordered frames and including one or more reference frames.

With reference now to FIG. 4, an illustrative structure of encoded content 400 encoded into one or more ordered subparts will be described. For purposes of an illustrative example, the content 400 can corresponds to multi-media content that has been encoded into a number of ordered frames, such as for purposes of data compression encoding, As illustrated in FIG. 4, the content 400 includes a number of frames 402 that correspond to reference frames for the encoded content 400. The reference frames 402 can be utilized during the rendering of the content 400 by a client computing device 102, such as for playback of a video content. Specifically, the reference frames 402 can function as the intermediary points utilized by a media player software application for playback controls, such as seeking. Additionally, the reference frames 402 can also be utilized for purposes of providing a user a preview of the different portions of the content, such as thumbnail previews. In some embodiment, the reference frames correspond to uncompressed, or otherwise unprocessed, portions of the encoded content. For example, in accordance with video compression, the reference frames are typically referred to as "i-frames." The encoded content 400 can also include a number of additional frames 404 that typically follow a reference frame 402. Illustratively, the frames of the encoded content 400 are sequentially ordered such the playback of the entire content would begin with a first frame of the encoded content and end with the last sequential frame of the encoded content.

As will be explained in greater detail below, in an illustrative embodiment, the transmittal of the encoded content 400 to a client computing device 102 from a CDN service provider 106 can include the transmittal of frames from different POPs. In one aspect, a first POP associated with the CDN service provider 106 can transmit at least a portion of reference frames and potentially some additional frames in a manner to facilitate the playback of the encoded content. Specifically, the first POP can be selected in a manner to minimize the effect of network latencies associated with the transmittal of the encoded content. In another aspect, a second POP associated with the CDN service provider 106 can transmit at least a portion of the additional frames. The second POP can be selected in a manner to minimize a cost associated with the transmittal of the additional frames. In still a further aspect, the second POP can prioritize and transmit the additional frames to provide the client computing device 102 the additional estimated to be the most likely frames to required by the client computing device 102 during rendering of the encoded content.

Figure 5A:
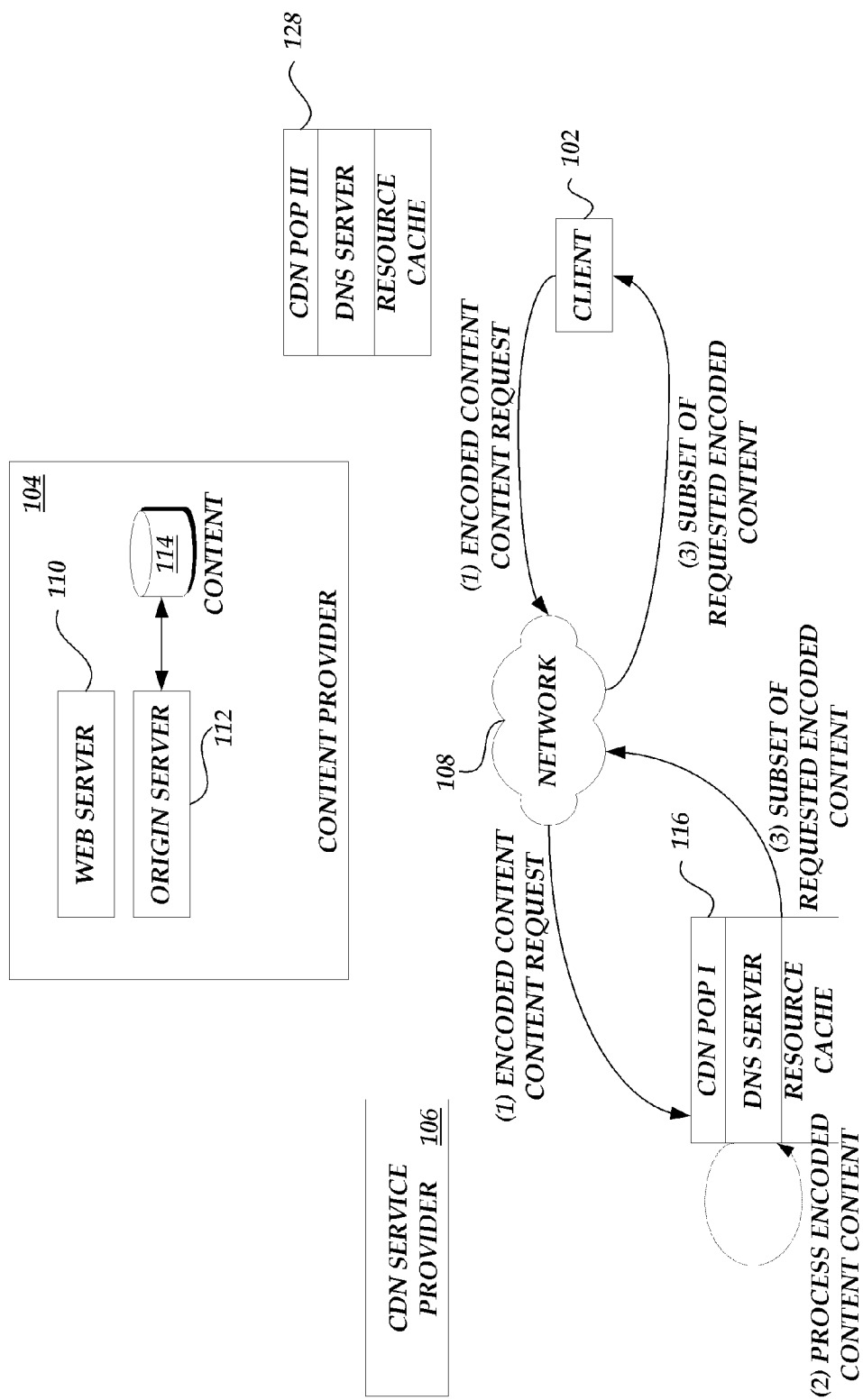
FIGS. 5A and 5B are block diagrams of the content delivery environment of FIG. 1 illustrating the generation and processing of streaming media content requests from a client computing device to a CDN service provider.

With reference now to FIG. 5A, once the client computing device 102 obtains the relevant IP address of a POP, the client computing device transmits a streaming media content request to the identified POP, illustratively, POP 116. Upon receipt of the request, the POP 116 processes the request and identifies at least a subset of the request encoded content that is to be provided to the client computing device 102. As described above, in one embodiment, the subset of the encoded content identified by the receiving POP 116 can include at least a portion of the reference frames of the encoded content. In another embodiment, the subset of the encoded content identified by the receiving POP 116 can include all of the reference frames of the encoded content. In a further embodiment, in one embodiment, the subset of the encoded content identified by the receiving POP 116 can include at least a portion of the reference frames of the encoded content and at least a portion of the additional frames of the encoded content. Illustratively, the subset of the encoded content is selected in a manner to minimize latencies associated with the delivery of the content to the client computing device 102. The identified subset is then transmitted to the client computing device 102. Additionally, in an illustrative embodiment, the receiving POP 116 can also transmit the identification of an alternative POP, or alternative POPs, that will transmit any remaining portions of the encoded content not transmitted by the receiving POP, generally referred to as the supplemental frames.

Figure 5B:
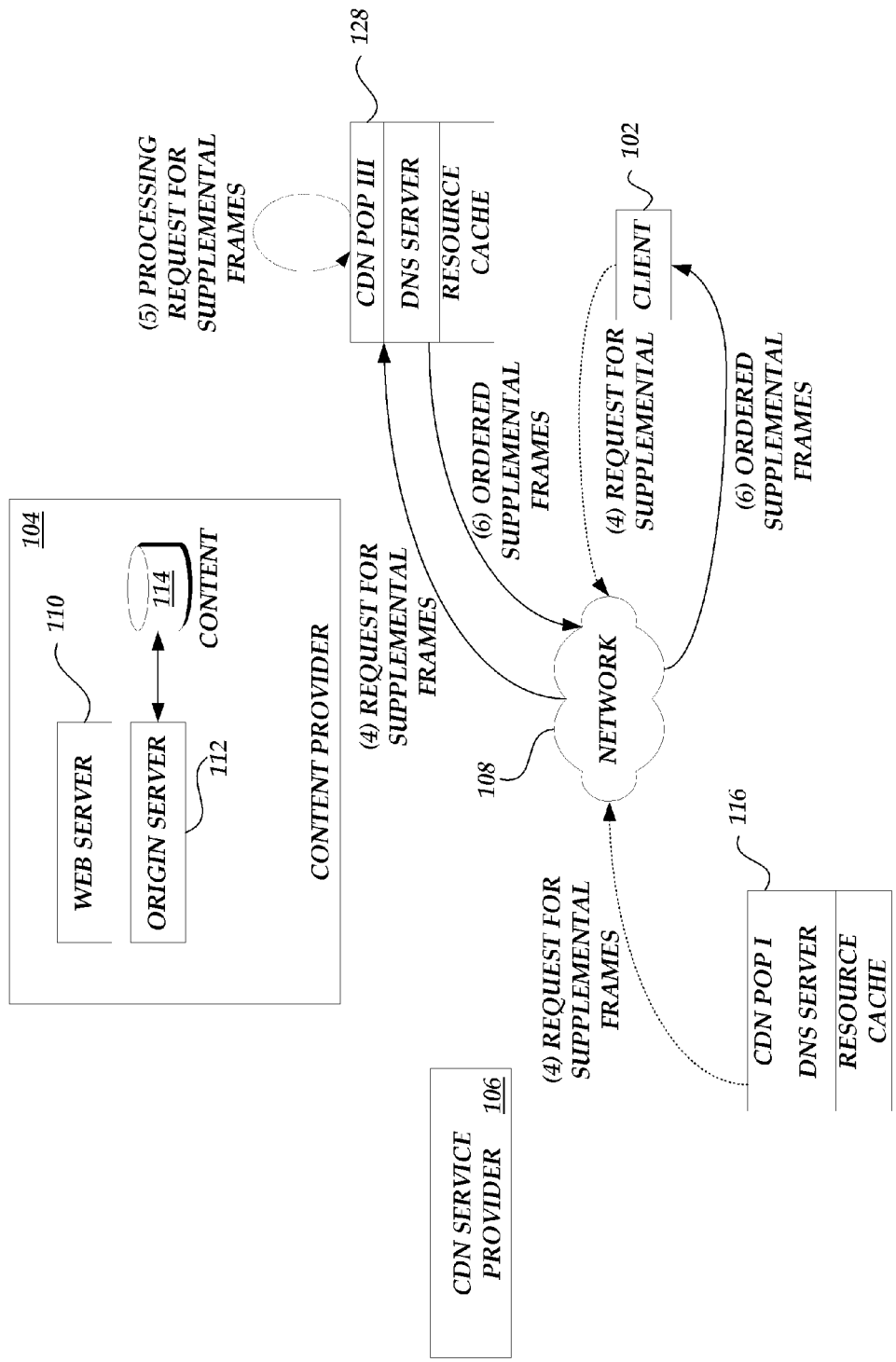

Turning to FIG. 5B, in one embodiment, the receiving POP 116 can transmit a request to the identified alternative POP, illustratively POP 128, or alternative POPs, requesting the transmittal of the supplemental frames to the client computing device 102. Alternatively, the client computing device 102 can initiate the request to the alternative POP 128. Upon receipt of the request (either from POP 116 or client computing device 102), the alternative POP 128 processes the request and identifies a subset of the encoded content that corresponds to the requested supplemental frames (or a portion of the supplemental frames if more than one alternative POP is utilized). Additionally, in an illustrative embodiment, the alternative POP 128 can then prioritize the order of the transmittal of the supplemental such that the supplemental frames most likely to be requested/required by the client computing device 102 will be transmitted first. The prioritization of the subset of encoded frames can be based on historical information related to previous access to the same content by the user or groups of users, previous access to the other content by the user or groups of users, statistical or probabilistic techniques, and the like. The alternative POP 128 transmits the supplemental frames in accordance with the priority.

Figure 6A:
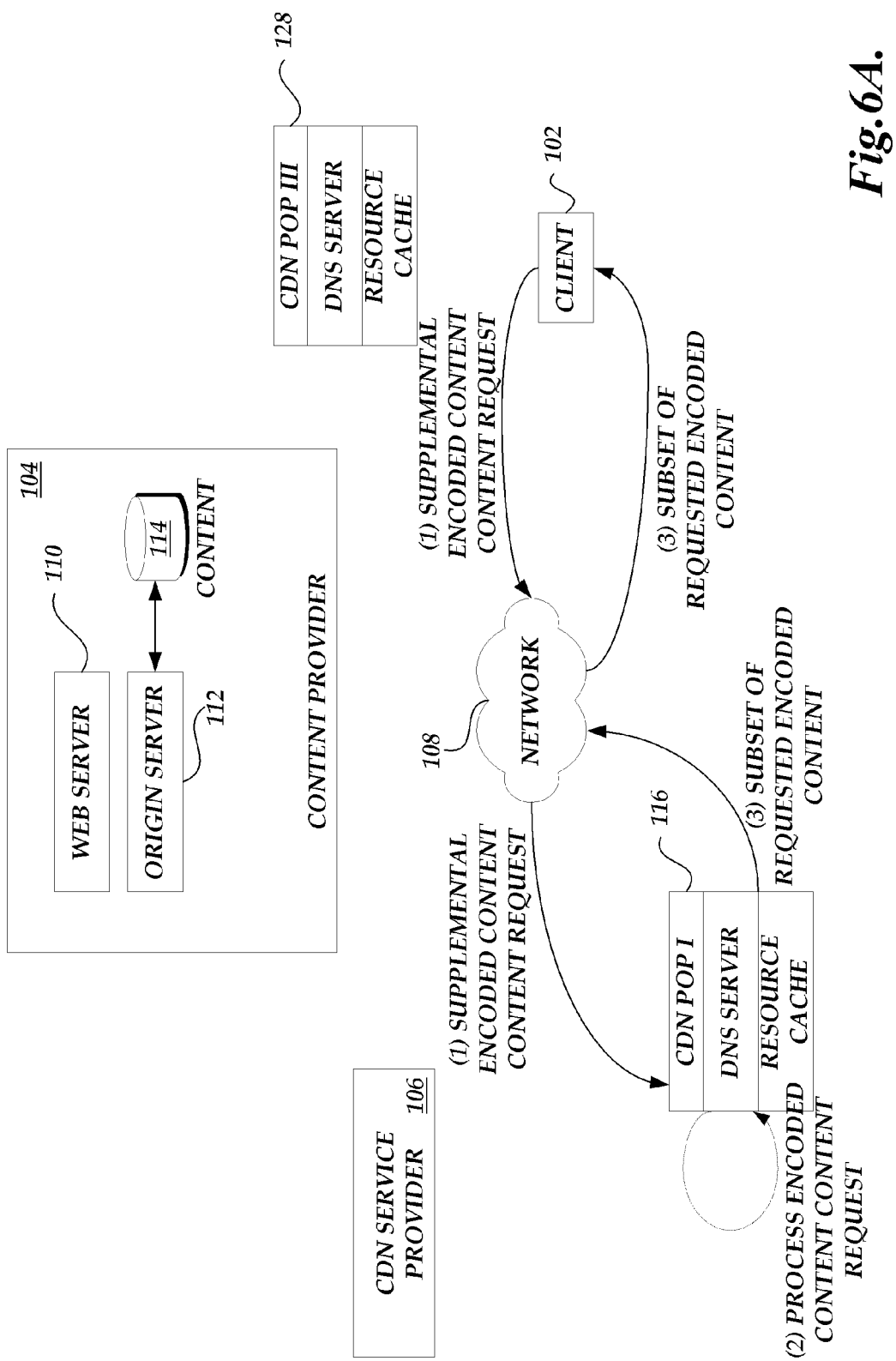
FIGS. 6A and 6B are block diagrams of the content delivery environment of FIG. 1 illustrating the generation and processing of supplemental streaming media content requests from a client computing device to a CDN service provider.

With reference now to FIG. 6A, in one embodiment in which less than all the encoded content has been transmitted to the client computing device 102, a request for supplemental (or additional) content may be obtained by the client computing device, such as from a user manipulating playback controls on a software application. If the requested content is not maintained by the client computing device 102, the client computing device transmits a supplemental streaming media content request to the originally identified POP 116. Similar to the process described with regard to FIG. 5A, upon receipt of the request, the POP 116 processes the request and identifies at least a subset of the request encoded content that is to be provided to the client computing device 102. The identified subset is then transmitted to the client computing device 102. Additionally, in an illustrative embodiment, the receiving POP 116 can also transmit the identification of an alternative POP, or alternative POPs, that will transmit any remaining portions of the encoded content not transmitted by the receiving POP, generally referred to as the supplemental frames.

Figure 6B:
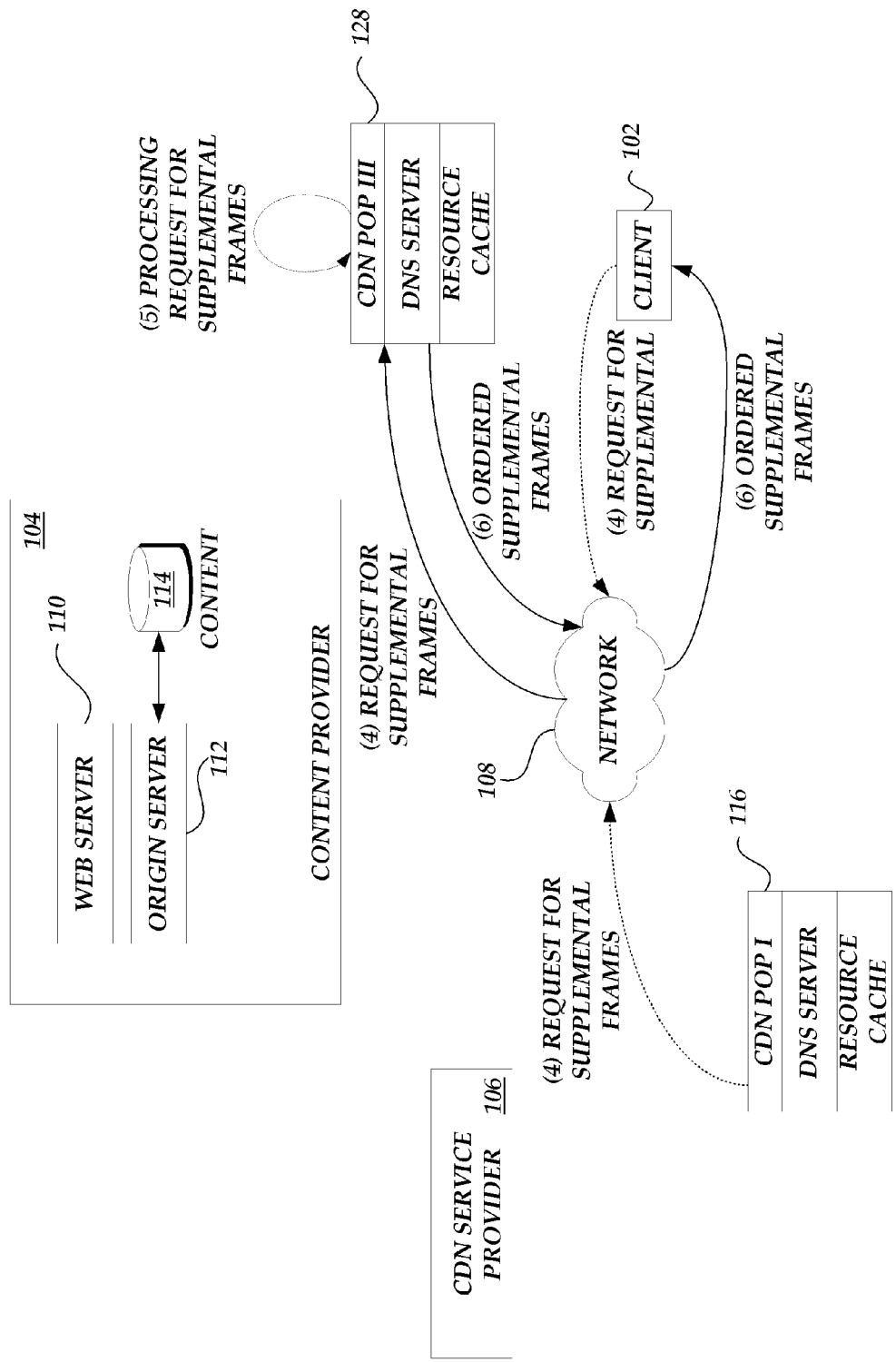

Turning to FIG. 6B, in one embodiment, the receiving POP 116 can transmit a request to the identified alternative POP, illustratively POP 128, or alternative POPs, requesting the transmittal of the supplemental frames to the client computing device 102. Alternatively, the client computing device 102 can initiate the request to the alternative POP 128. Upon receipt of the request (either from POP 116 or client computing device 102), the alternative POP 128 processes the request and identifies a subset of the encoded content that corresponds to the requested supplemental frames (or a portion of the supplemental frames if more than one alternative POP is utilized). Additionally, in an illustrative embodiment, the alternative POP 128 can then prioritize the order of the transmittal of the supplemental such that the supplemental frames most likely to be requested/required by the client computing device 102 will be transmitted first. The prioritization of the subset of encoded frames can be based on historical information related to previous access to the same content by the user or groups of users, previous access to the other content by the user or groups of users, statistical or probabilistic techniques, and the like. The alternative POP 128 transmits the supplemental frames in accordance with the priority. Accordingly, the process illustrated FIGS. 6A and 6B can be repeated until the encoded content is transmitted and stored at the client computing device 102 or until the content is no longer required by the client computing device.

Figure 7:
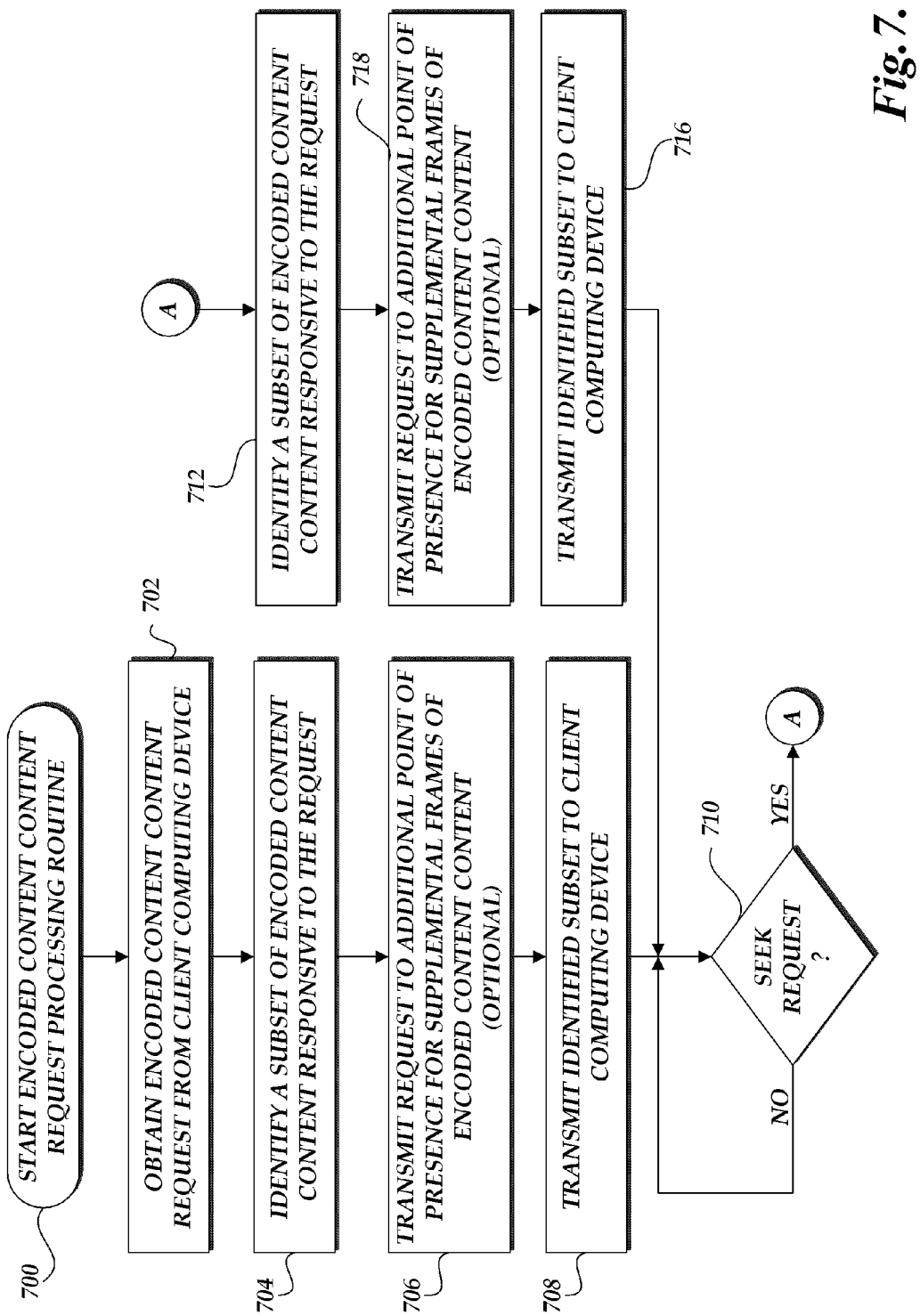
FIG. 7 is a flow diagram of an encoded media content request processing routine implemented by a CDN service provider.

With reference now to FIG. 7, flow diagram of an encoded media content request processing routine 700 implemented by a CDN service provider 106 will be described. Illustratively, routine 700 is illustrated from the perspective of a POP that receives and process the initial request for encoded media. One skilled in the relevant art will appreciate that actions/steps outlined for routine 700 may be implemented by one or many computing devices/components that are associated with the CDN service provider 106. Accordingly, routine 700 has been logically associated as being performed by the CDN service provider 106.

At block 702, one of the client computing devices associated with the CDN service provider 106 obtains a streaming media, or encoded media, request from a client computing device 102. As previously described, the encoded content request can originate from the client computing device 102 from various software applications including media player software application, Web browsing software applications and the like. Additionally, the encoded content request can be transmitted in accordance with any number of network protocols. In an illustrative embodiment and as previously described, a successful resolution of an original URL results in the identification of a network address, such as an IP address, of a DNS server associated with the CDN service provider 106. In this embodiment, the IP address can be shared by one or more POPs. Accordingly, the further DNS query to the shared IP address utilizes a one-to-many network routing schema, such as anycast, such a specific POP will receive the request as a function of network topology. The client computing device request can include a variety of additional information including user or account identifiers, login information, security tokens, and the like.

At block 704, the receiving computing device at the CDN service provider 106 identifies a subset of the encoded content responsive to the request and that can be provided to the client computing device. Illustratively, the subset of the encoded content can corresponds to a selection of at least a portion of the reference frames of the encoded content and some additional frames of the encoded content. The number of frames included in the subset can correspond to a selection of the number of frames that can be transmitted to the client computing device 102 within an established time period or the number of frames the requesting client computing device can process.

At block 706, the receiving computing device at the CDN service provider 106 can optionally transmit a request to one or more additional computing devices at the CDN service provider 106 for supplemental frames of the requested encoded content. The request transmitted by the receiving computing device at the CDN service provider 106 can include an identification of the encoded content, the identification of the identified subset of the encoded frames to be provided by the receiving computing device at the CDN service provider 106, as well as additional information identifying the requesting client computing device 102. At block 708, the receiving computing device at the CDN service provider 106 transmits the identified subset of the encoded to the requesting client computing device 102. In embodiments in which the client computing device 102 requests the supplemental encoded frame information from the additional computing devices at the CDN service provider 106, block 706 may be omitted. Additionally, block 708 may include the transmission of identification information to one or more alternative computing devices at the CDN service provider 106 from the receiving computing device at the CDN service provider 106.

Once the subset of the encoded content is transmitted, the receiving computing device at the CDN service provider 106 may not have any additional information or data to transmit or process responsive to the initial request. At decision block 710, a test is conducted to determine whether the client computing device 102 has transmitted a subsequent request for supplemental frames of the encoded content, such as responsive to a seek request during rendering of the encoded content. If not, the routine 700 returns to decision block 710. Alternatively, if the client computing device 102 has transmitted a subsequent request for supplemental frames of the encoded content, at block 712, the receiving computing device at the CDN service provider 106 identifies a subset of the encoded content responsive to the supplemental request. As described above with regard to block 704, illustratively, the subset of the encoded content can corresponds to a selection of at least a portion of the reference frames of the encoded content and some additional frames of the encoded content. The number of frames included in the subset can correspond to a selection of the number of frames that can be transmitted to the client computing device 102 within an established time period or the number of frames the requesting client computing device can process.

At block 718, the receiving computing device at the CDN service provider 106 can optionally transmit a second request to one or more additional computing devices at the CDN service provider 106 for supplemental frames of the requested encoded content. As described above with regard to block 706, the request transmitted by the receiving computing device at the CDN service provider 106 can include an identification of the encoded content, the identification of the identified subset of the encoded frames to be provided by the receiving computing device at the CDN service provider 106, as well as additional information identifying the requesting client computing device 102. At block 716, the receiving computing device at the CDN service provider 106 transmits the identified subset of the encoded to the requesting client computing device 102. In embodiments in which the client computing device 102 requests the supplemental encoded frame information from the additional computing devices at the CDN service provider 106, block 712 may be omitted. The routine 700 then returns to decision block 710 to determine whether additional user actions/commands are received.

Figure 8:
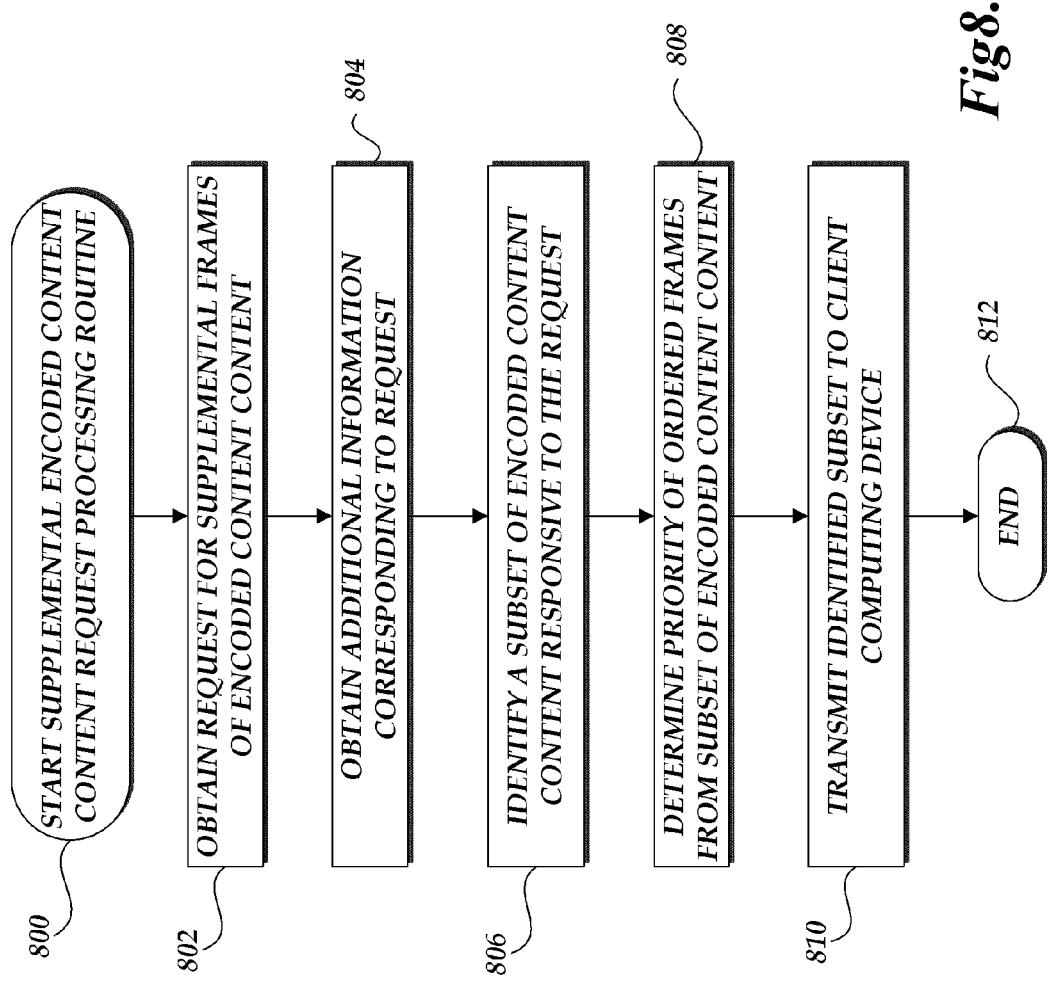
FIG. 8 is a flow diagram of a supplemental encoded media content request processing routine implemented by a CDN service provider.

With reference now to FIG. 8, a flow diagram of a supplemental encoded media content request processing routine 800 implemented by a CDN service provider 106 will be described. Illustratively, routine 800 is illustrated from the perspective of a POP that receives and process the supplemental request for encoded media (e.g., the alternative POP). One skilled in the relevant art will appreciate that actions/steps outlined for routine 800 may be implemented by one or many computing devices/components that are associated with the CDN service provider 106. Accordingly, routine 800 has been logically associated as being performed by the CDN service provider 106.

At block 802, one of the computing devices associated with the CDN service provider 106 obtains a request for supplemental frames of the encoded content. In one embodiment, the request for supplemental frames may be obtained directly from a client computing device 102. In another embodiment, the request for supplemental frames may be obtained from an original receiving computing device at the CDN service provider 106. The request can include various information including information identifying user accounts, the original receiving computing device at the CDN service provider 106, the frames to be provided by the receiving computing device at the CDN service provider 106, and the like. At block 804, the computing device obtains any additional information that will be utilized to select the subset of the supplemental frames of the encoded content or to priority the transmission of the subset. Examples of the additional information can include, but are not limited to, information identifying historical access/rendering of the requested encoded content, information identifying historical access/rendering of groups of content, user profile information, group profile information, etc.

At block 806, the computing device identifies a subset of the supplemental frames of the encoded media. Illustratively, the supplemental frames can correspond to any remaining frames not transmitted by the original receiving computing device (FIG. 7). Alternatively, if multiple alternative computing devices are being utilized, the determination of the subset can correspond to the selection of the number of frames that can be transmitted within a fixed time period or the number of frames capable of being processed by the requesting client computing device. At block 808, the computing device prioritizes the subset of the supplemental frames. In one embodiment, the computing device can prioritize the subset of the supplemental frames in accordance with a statistical technique in which frames are selected in an order to reduce the mean distance between the frames previously transmitted (or the beginning) and end last frame of the encoded content (or other reference point). One such technique, referred to as a binary fill in, corresponds to the division of the mean distance to identify the next encoded frame.

In another embodiment, historical information related to habits or experiences with previous renderings of the same encoded content can be utilized. The habits or experiences may be based on a user (or user account) associated with the client computing device 102. Alternatively, the habits or experiences can correspond to groups of users. In this embodiment, although the encoded content includes sequentially ordered frames, the habits or experiences with previous renderings may indicate the tendencies for users to skip some frames or advance the rendering of content to specific frames. Accordingly, in this embodiment, the computing device can prioritize any frames in accordance such historical information.

In a similar light, in a further embodiment, historical information related to habits or experiences with previous renderings of the other encoded content can be utilized. The habits or experiences may be based on a user (or user account) associated with the client computing device 102. Alternatively, the habits or experiences can correspond to groups of users. In this embodiment, the habits or experiences with previous renderings of other encoded content may also indicate the tendencies for users to skip some frames or advance the rendering of content to specific frames. Accordingly, in this embodiment, the computing device can prioritize any frames in accordance such historical information.

One skilled in the relevant art will appreciate that the above techniques may be combined by the computing device. Additional alternative statistical, historical or probabilistic techniques may also be incorporated to assist in the prioritization of the subset of frames. At block 810, the computing device transmits the identified subset to the client computing device. At block 812, the routine 800 terminates.

Figure 9:
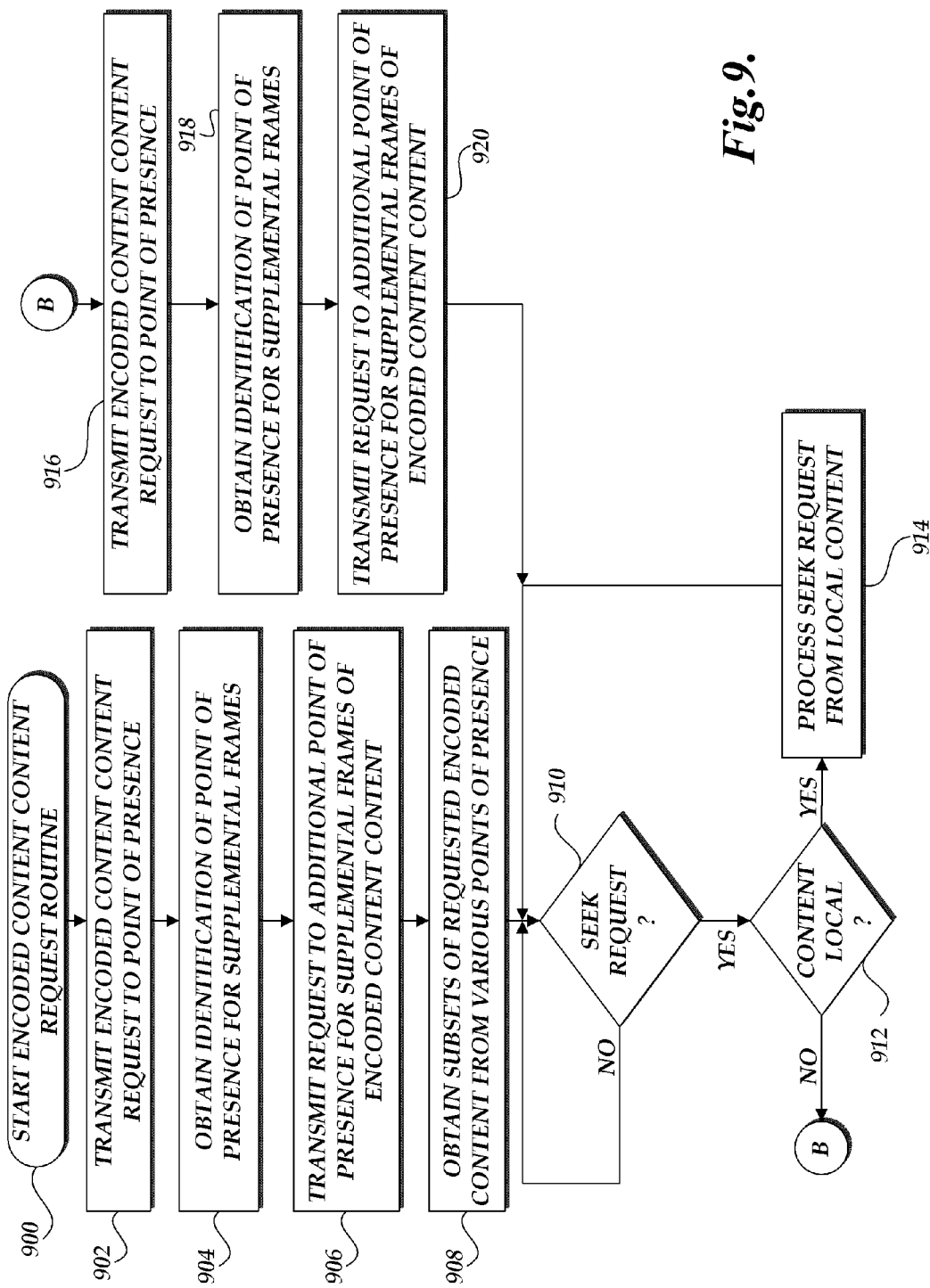
FIG. 9 is a flow diagram of an encoded media content request routine implemented by a client computing device.

With reference now to FIG. 9, a flow diagram of an encoded content request routine 900 implemented by a client computing device 102 will be described. At block 902, the client computing device 102 transmits an encoded content request to an original computing device associated with the CDN service provider 106. The request can include a variety of information for identifying a user (or user account), the client computing device 102, the requested content, the content provider 104 and the like. At block 904, the client computing device 102 optionally obtains the identification of alternative POPs that will be utilized to transmits supplemental frames of the encoded content. At block 906, the client computing device 102 transmits a request for supplemental frames to one or more additional POPs. At block 908, the client computing device 102 obtains frames of the encoded content from at least two POPs responsive to the requested content.

At decision block 910, a test is conducted to determine whether a user associated with the client computing device 102 has indicated a request for additional content, such as a seek request. If not, the routine 900 returns to decision block 910. Alternatively, the client computing device 102 determines at decision block 912 whether the requested content (or reference frame) has already been transmitted to the client computing device 102 and maintained by the client computing device for rendering. If so, the client computing device 102 provides the supplemental content from local storage, such as temporary memory, rendering buffers, and the like.

Alternatively, if requested content has not been transmitted or is otherwise unavailable, at block 916, the client computing device 102 transmits a supplemental request for encoded content request to an original computing device associated with the CDN service provider 106. The request can include a variety of information for identifying a user (or user account), the client computing device 102, the requested content, the content provider 104 and the like. At block 918, the client computing device 102 optionally obtains the identification of alternative POPs that will be utilized to transmits supplemental frames of the encoded content. At block 920, the client computing device 102 transmits a request for supplemental frames to one or more additional POPs. The routine 900 then returns to decision block 910 to determine whether additional user interaction has been received.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure."

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for request routing comprising:
   obtaining, by a first Point of Presence, a request corresponding to encoded content, the encoded content defined by a series of ordered frames including a number of reference frames within the encoded content;
   transmitting, by the first Point of Presence, a subset of frames less than the encoded content, the subset of frames including one or more reference frames;
   obtaining, by a second Point of Presence, a second request corresponding to the encoded content, the request corresponding to a second subset of the encoded content including at least some portion of the ordered frames of the encoded content not previously included in the subset of frames transmitted by the first Point of Presence;
   determining, by the second Point of Presence, a transmitting order for the sequentially ordered frames included in the second subset, the transmitting order different from an order corresponding to the sequence of frames and determined, at least in part, on historical information used to prioritize at least a portion of the ordered frames estimated to be required during rendering; and
   transmitting, by the second Point of Presence, the second subset of the encoded content.

2. The method as recited in claim 1, wherein the subset of frames transmitted by the first Point of Presence includes all reference frames in the encoded content.

3. The method as recited in claim 1, wherein the second subset of frames transmitted by the second Point of Presence does not include any reference frames of the encoded content.

4. The method as recited in claim 1, wherein the second request is transmitted by at least one of the first Point of Presence and a client computing device.

5. The method as recited in claim 1, wherein the first and second request is associated with a user.

6. The method as recited in claim 5, wherein determining a transmitting order includes determining the transmitting order based on historical information regarding the rendering of the encoded content.

7. The method as recited in claim 6, wherein the historical information is based on at least one of an identified user and a group of users.

8. The method as recited in claim 5, wherein determining a transmitting order includes determining the transmitting order based on historical information regarding the rendering of encoded content.

9. The method as recited in claim 8, wherein the historical information is based on at least one of an identified user and a group of users.

10. The method as recited in claim 1, wherein determining the transmitting order for the sequentially ordered frames included in the second subset further comprises prioritizing any reference frames included in the second subset.

11. The method as recited in claim 1, wherein determining the transmitting order for the sequentially ordered frames included in the second subset further comprises:
    determining a current frame position and an ending frame position; and
    identifying a frame having a mean position between the current frame position and the ending frame position; and
    adding the identified frame into the transmitting order.

12. The method as recited in claim 11, wherein the current frame position corresponds to at least one of a current rendering position and a last transmitted frame.

13. The method as recited in claim 11, wherein ending frame position corresponds to at least one of a last frame in the encoded content and a last transmitted frame.

14. A method for processing content requests comprising:
    obtaining a request corresponding to encoded content, the encoded content defined by a series of ordered frames including a number of reference frames within the encoded content;
    transmitting a first subset of frames, the subset of frames including one or more reference frames;
    obtaining a second request corresponding to the encoded content, the request corresponding to a second subset of the encoded content including at least some portion of the ordered frames of the encoded content not previously included in the first subset of frames;
    prioritizing at least a portion of the sequentially ordered frames included in the second subset based, at least in part, on historical information;
    determining a transmitting order for the sequentially ordered frames included in the second subset based, at least in part on the prioritization, the transmitting order different from an order corresponding to the sequence of frames; and
    transmitting the second subset of the encoded content.

15. The method as recited in claim 14, wherein the first subset of frames includes all reference frames in the encoded content.

16. The method as recited in claim 14, wherein the second subset of frames includes at least one reference frame of the encoded content.

17. The method as recited in claim 14, wherein the second request is transmitted by at least one of a first Point of Presence and a client computing device.

18. The method as recited in claim 14, wherein the first and second request is associated with a user.

19. The method as recited in claim 14, wherein determining a transmitting order includes determining the transmitting order based on historical information regarding the rendering of the encoded content.

20. The method as recited in claim 19, wherein the historical information is based on at least one of an identified user or a group of users.

21. The method as recited in claim 20, wherein determining a transmitting order includes determining the transmitting order based on historical information regarding the rendering of encoded content.

22. The method as recited in claim 21, wherein the historical information is based on at least one of an identified user or a group of users.

23. The method as recited in claim 14, wherein determining the transmitting order for the sequentially ordered frames included in the second subset includes:
   determining a current frame position and an ending frame position; and
   identifying a frame having a mean position between the current frame position and the ending frame position; and
   adding the identified frame into the transmitting order.

24. A system for request routing comprising:
   a first network point of presence associated with a content delivery network service provider, wherein the first network point of presence is operable to:
      obtain a request corresponding to encoded content, the encoded content defined by a series of ordered frames including a number of reference frames within the encoded content; and
      transmit a first subset of frames, the subset of frames including one or more reference frames;
   a second network point of presence associated with a content delivery network service provider, wherein the second network point of presence is operable to:
      obtain a second request corresponding to the encoded content, the request corresponding to a second subset of the encoded content including at least some portion of the ordered frames of the encoded content not previously included in the first subset of frames;
      prioritize at least a portion of the sequentially ordered frames included in the second subset based, at least in part, on historical information;
      determine a transmitting order for the sequentially ordered frames included in the second subset, based, at least in part, on the prioritization, the transmitting order different from an order corresponding to the sequence of frames; and
      transmit the second subset of the encoded content.

25. The system as recited in claim 24, wherein the second request is transmitted by at least one of the first Point of Presence and a client computing device.

26. The system as recited in claim 24, wherein the first and second request is associated with a user.

27. The system as recited in claim 24, wherein determining a transmitting order includes determining the transmitting order based on historical information regarding the rendering of the encoded content.

28. The system as recited in claim 27, wherein the historical information is based on at least one of an identified user and a group of users.

29. The system as recited in claim 24, wherein determining a transmitting order includes determining the transmitting order based on historical information regarding the rendering of encoded content.

30. The system as recited in claim 29, wherein the historical information is based on at least one of an identified user and a group of users.

31. The system as recited in claim 24, wherein determining the transmitting order for the sequentially ordered frames included in the second subset includes:
   determining a current frame position and an ending frame position; and
   identifying a frame having a mean position between the current frame position and the ending frame position; and
   adding the identified frame into the transmitting order.

* * * * *